E. R. PLAYLE.
CRUCIBLE FOR MELTING METALS.
No. 88,072. Patented Mar. 23, 1869.
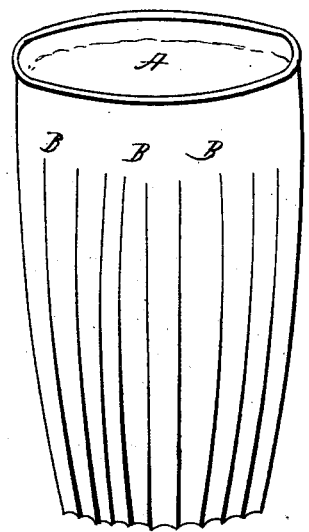
Witnesses;
James B. Vredenburgh
Charles C. Odell
Inventor;
E. R. Playle

EDWARD R. PLAYLE, OF GREAT BEND, PENNSYLVANIA.

Letters Patent No. 88,072, dated March 23, 1869.

IMPROVEMENT IN CRUCIBLES FOR MELTING METALS.

The Schedule referred to in these Letters Patent and making part of the same.

*To all whom it may concern:*

Be it known that I, EDWARD R. PLAYLE, of Great Bend, in the county of Susquehanna, and State of Pennsylvania, have invented a new and useful Improvement in Crucible; and I do hereby declare that the following is a full, clear, and exact description of the construction and operation of the same, reference being had to the annexed drawings, and to the letters of reference marked thereon, in which—

Figure 1 is a perspective view.
Letter A is the crucible.
Letters B B B are the corrugations.

I construct my crucible in the old-fashioned manner, namely, spin them up, then set them in a mould that is corrugated, or hollow them in by hand. The corrugated form prevents the draught, or blast from cutting out the body as fast as it does those that are plain.

*Claim.*

I claim a crucible, whose outer surface is corrugated, as herein described.

E. R. PLAYLE.

Witnesses:
JAMES B. VREDENBURGH,
CHARLES C. ODELL.